June 5, 1934.  J. C. DRADER ET AL  1,961,925
TESTING DEVICE
Filed Dec. 24, 1928    2 Sheets-Sheet 1
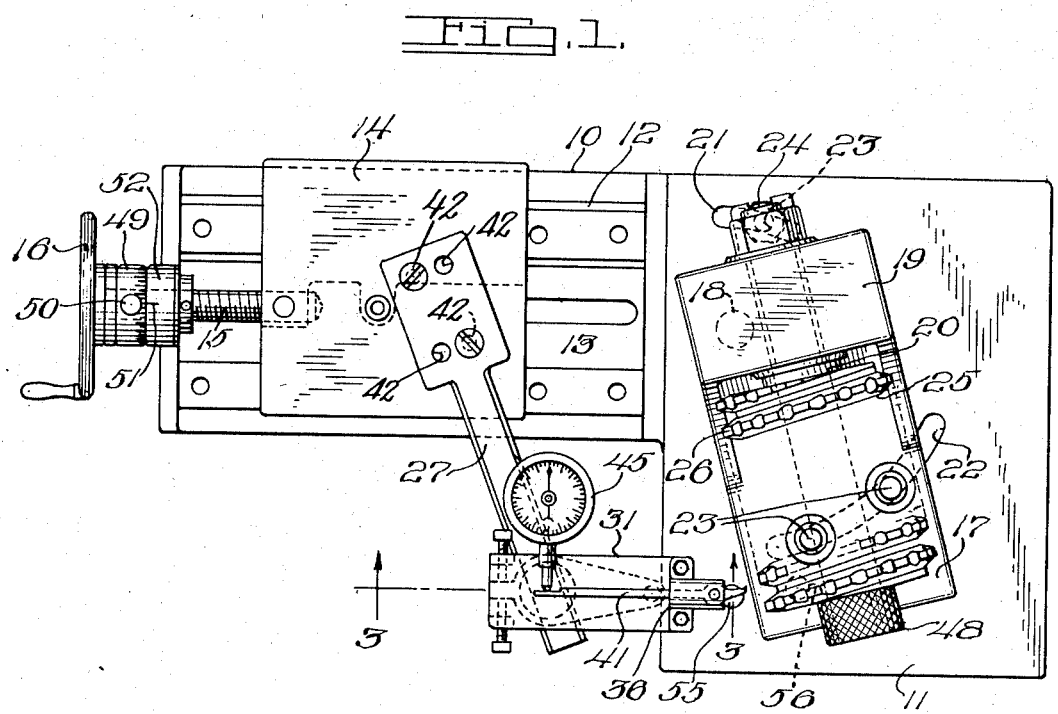
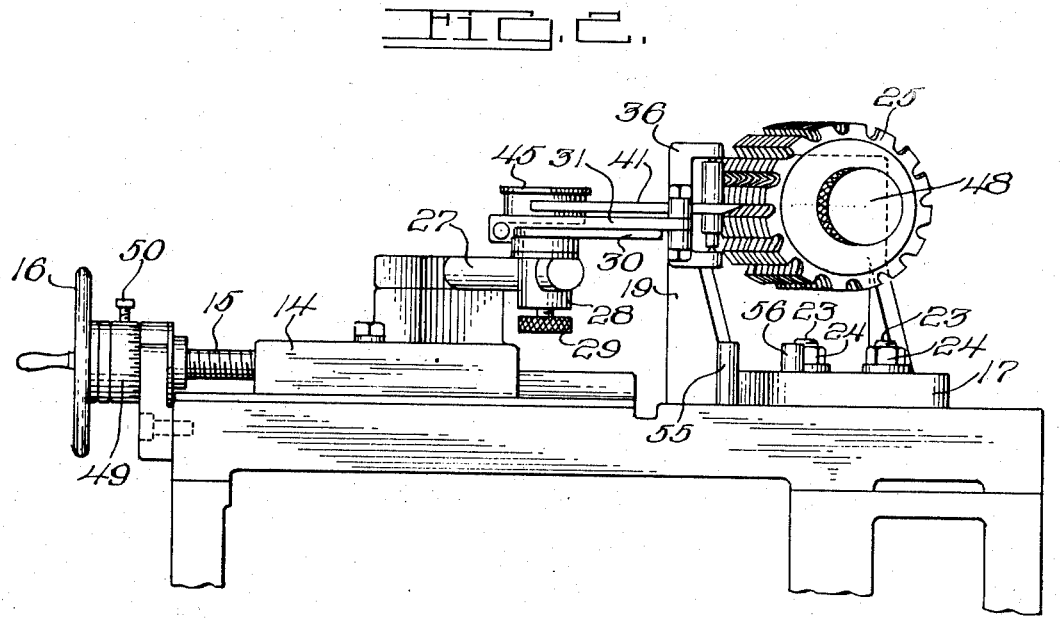
Inventors:
Joseph C. Drader
Wm F. Dalzen
BY
Harness, Dickey & Pierce
ATTORNEYS.

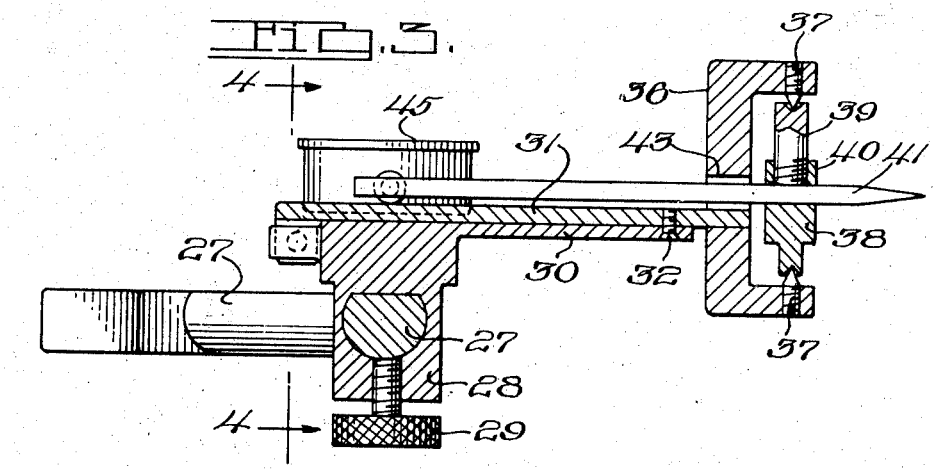
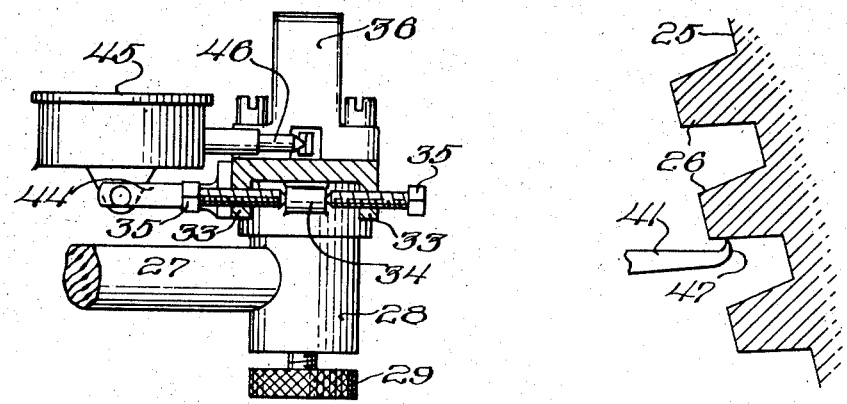
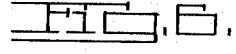
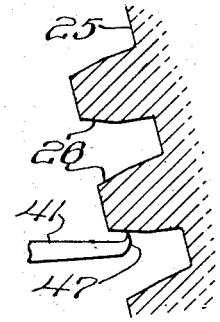

Patented June 5, 1934

1,961,925

UNITED STATES PATENT OFFICE 1,961,925

TESTING DEVICE

Joseph C. Drader, Detroit, and William F. Dalzen, Grosse Pointe Park, Mich., assignors to Michigan Tool Company, a corporation of Michigan Application December 24, 1928, Serial No. 328,112

12 Claims. (Cl. 33—172)

This invention relates to testing devices and particularly to such devices as are employed for checking machine elements having cutting teeth formed on the surface thereof, or having helical projections thereon, the principal object being the provision of a method and means for accurately checking the angularity of the sides of such teeth or of such helical projections.

Another object is the provision of a device for checking the accuracy of the angle of the sides of threads, hob teeth, and the like.

Another object is the provision of a device for checking angularity of threads, hobs or other cutter teeth, it being adjustable to take care of teeth having different side angles, or a single tooth having a multiplicity of side angles.

A further object is to provide a quick, easy and accurate method of checking the angularity of the sides of cutter teeth, threads, or the like.

The above being among the objects of the present invention, the same consists in certain features of construction and combinations of parts to be hereinafter described with reference to the accompanying drawings, and then claimed, having the above and other objects in view.

In the accompanying drawings which show a suitable embodiment of the present invention, and in which like numerals refer to like parts throughout the several different views;

Fig. 1 is a plan view of the testing machine.

Fig. 2 is a side view of the testing machine.

Fig. 3 is an enlarged sectional view taken on the line 3—3 of Fig. 1 showing the gage mechanism in greater detail.

Fig. 4 is a view taken on the line 4—4 of Fig. 3.

Figs. 5 and 6 are enlarged diagrammatic views illustrating the manner in which a pressure receiving finger hereinafter referred to as the indicator pointer of the measuring device cooperates with the cutter teeth in checking the accuracy of the latter.

It is of extreme importance in the manufacture of hobs, milling cutters, and the like for some classes of work, that the angle of the sides of the cutter teeth be extremely accurate and uniform throughout all of the teeth. With the increasing demand for greater accuracy in this respect the need has arisen for a device for accurately checking such angles, and with this need in view the present invention has been developed to accomplish the accurate checking demanded.

Referring to the accompanying drawings, we show in Figs. 1 and 2 a device having a bed of substantially L-shape comprising a portion 10 adapted to carry a sliding head or table, and a portion 11 above which the work is carried and which extends at substantially right angles to the portion 10. The portion 10 is provided with a pair of parallel horizontal slides 12 and 13 upon which is slidably mounted a table 14 which is adapted to be moved back and forth on the slides 12 and 13 by means of a screw 15 controlled by a hand wheel 16. Positioned on the portion 11 of the base is a bracket member 17 provided with a vertically extending pin 18 which is rotatably received in a suitable opening in the portion 11 and about the axis of which the bracket 17 is adapted to swing in a horizontal plane. The bracket member 17 is provided with an upwardly extending portion 19 in which is secured a supporting bar 20 lying in a horizontal plane and adapted to be swung in a horizontal plane with the bracket 17. The portion 11 of the base is provided with a pair of arcuate slots 21 and 22 whose centers coincide with the center of the pin 18. Means such as one or more clamping bolts such as 23 extending through the brackets 17 and through the slots 21 and 22 and provided with nuts 24 may be employed for the purpose of rigidly locking the bracket 17 in any one of its adjusted positions on the base portion 11. The supporting bar 20 is adapted to receive the article to be tested which as previously described, may be a milling cutter, a hob, or other such cutting tool, or as will hereinafter be apparent, a threaded bar or like object may be supported by the bracket 17 for testing by removal of the supporting bar 20 and providing other suitable supporting means therefor on the bracket 17. For the purpose of illustration we have shown a hob 25 mounted on the support bar 20, the hob 25 being provided with cutting teeth such as 26.

Rigidly secured to the table 14 and extending laterally therefrom is a bar 27 having a plurality of holes 42 by which it may be positioned at various angles relative to the table. Upon the unsupported end of the bar, as shown in detail in Figs. 3 and 4, a slidable bracket 28 is mounted. As indicated in Fig. 3 the bar 27 is preferably of non-circular cross-sectional shape and is received in a similarly shaped opening in the bracket 28 so as to prevent relative rotation of the bracket 28 on the bar 27. The bracket 28 may be locked in any particular position along the length of the bar 27 by means of the screw 29. The bracket 28 is provided with an extended supporting portion 30 projecting toward the hob 25 and provided with a horizontal upper face. A member 31 overlies the supporting portion 30 and is secured thereto by a vertically extending pin 32 which permits swinging movement of the member 31 about the center of the pin 32 in a horizontal plane. The member 31 is provided at one end with a pair of downwardly extending spaced lugs 33, best shown in Figs. 3 and 4, between which is positioned an extending tongue 34 formed on the bracket 28. A screw 35 is threaded through each of the lugs 33 and their inner ends are adapted to contact with the tongue 34 to control the swingable position of the member 31 on the bracket 28 about the axis of the screw 32. It will be apparent that with this construction, upon suitable adjustment of the screws 35 the member 31 may be caused to pivot about the axis of the screw 32.

The opposite end of the member 31 is provided with a yoke-like member 36 rigidly secured thereto. Rotatably supported between the pivot screws 37 carried by the arms of the yoke member 36 and in vertical alignment with each other is an axle member comprising a lower portion 38 and an upper portion 39 threadably engaging each other. The portion 38 is provided with a transverse opening 40 through which a pointer member 41 extends and which is clamped in fixed position relative to the member 38 by means of the upper member 39. The yoke member 36 is provided with an opening 43 through which the rear end of the pointer member 41 extends and in which it is allowed a limited movement.

Suitably secured to the rear end of the member 31 through the bracket 44 is a conventional micrometer gage 45 whose shaft 46 extends in a horizontal direction and in generally perpendicular relation with respect to the axis of the pointer 41, and which shaft 46 is adapted to bear against the rear end of the pointer 41 so that any movement of the pointer 41 may be indicated by the gage 45. The forward end of the pointer 41 is preferably provided with a bent end portion 47 as best indicated in Figs. 5 and 6.

The sides of the cutter teeth or threads of the type adapted to be tested by this device are generally formed as a single straight line as indicated in Fig. 5, or of a plurality of straight lines as indicated in Fig. 6. Considering the form of tooth shown in Fig. 5 in which the side is formed as a single straight line, the method employed for determining the accuracy of such side is as follows:

The hob 25 or other cutter having such teeth is mounted on the supporting bar 20 and may be locked against axial movement thereon by a nut such as 48, the required or theoretically correct angle of the side of the teeth to be tested of course being known. The bracket 17 is shifted on the portion 11 of the bed about the axis of the pin 18 until such side of the tooth theoretically lies parallel to the path of travel of the table 14. The table 14 is then advanced by means of the hand wheel 16 and screw 15 until the end 47 of the pointer 41 is brought up to the tooth to be tested. If the end of the pointer 41 is not positioned lengthwise of the cutter so as to correctly engage the particular tooth to be tested, the bracket 28 may be shifted on the bar 27 to approximately the position required, and the screws 35 may then be manipulated to shift the member 31 and the pointer 41 so as to bring the end of the pointer into contact with the side of the tooth. The end 47 of the pointer to serve as a pressure-receiving or feeler element is preferably pressed against the side of the tooth with sufficient force to cause the pointer of the gage 45 to be moved a material amount. The gage may then be set at this arbitrary zero and the hand wheel 16 operated so as to cause the table, and therefore the pointer 41, to move so as to make the end 47 of the pointer traverse the depth of the tooth to be checked moving in a plane parallel with the plane of adjustment of the work support and extending through the axis of the work.

It will be obvious that inasmuch as the hob or other cutter 25 whose teeth are to be checked has been set so that the side of the tooth being checked is parallel to the path of travel of the table 14, that if the tooth is perfect the end 47 of the pointer 41 will not be caused to pivot about the pivot members 37 and therefore no movement of the same will occur which will be indicated on the gage 45. However, should the angle of the side of the tooth vary from that desired, such side of the tooth will then not be in parallel relationship with respect to the path of movement of the table 14, and therefore the end 47 of the pointer in moving over the side of the tooth will move laterally with respect to the path of movement of the table 14, and such lateral movement will be indicated on the gage 45. The distance of the point of contact of the end 47 of the pointer 41 with the tooth from the axis of the pivot points 37, and the distance from the axis of the pivot points 37 to the point of contact of the pointer 41 with the shaft 46 of the gage 45 are preferably so proportioned that the lateral movement of the end 47 and therefore the actual amount of inaccuracy of the tooth being tested may be read in decimal parts of an inch or other measuring unit directly from the gage 45.

Where the side of a tooth is made up of more than one straight line, as by two straight lines indicated in Fig. 6, the checking may be conducted in a similar manner as previously described, each straight portion being checked independently of the other. In such a case the bracket 17 may be swung about the axis of the pin 18 so as to bring that portion of the tooth to be first tested into parallel relationship with the path of movement of the table 14. The depth of the particular straight portion of the tooth to be checked is, of course, known in each case. Accordingly a gage collar such as 49 may be adjustably secured to the shaft 15 of the hand wheel 16 by means of a screw such as 50 so as to cooperate with a suitable mark such as 51 on the bearing 52 for the shaft 15, so that upon rotation of the hand wheel 16, the travel of the table 14 in decimal parts of an inch or other measuring unit may be readily determined, the end 47 of the pointer 41 moving, of course, an equal distance. Then by bringing the end 47 of the pointer to one limit of the particular portion of the tooth to be tested, and by moving the hand wheel 16 as indicated on the collar 49 a sufficient amount to move the end 47 of the pointer over the depth of that portion of the tooth to be checked, the accuracy of that portion may be readily determined as before explained.

Inasmuch as the angularity of the sides of such threads or teeth to be tested usually runs between relatively well defined limits, the supporting bar 27 is preferably set at an angle which will bring it to approximately parallel relation to the axis of a cutter or other article to be tested having teeth or threads whose angle is approximately a mean value of all articles which will ordinarily be tested on the device. This permits more ready adjustment of the end of the pointer with respect to the particular tooth to be tested, inasmuch as it is then not necessary to run the table 14 forwards or backwards to the extent that would be necessary if the bar 27 extended perpendicularly with respect to the path of movement of the table 14.

In order to facilitate the setting of the axis of the supporting bar 20 for the work to be tested at the correct angle with respect to the path of movement of the table 14, and therefore the pointer end 47, guidance means such as the following may be provided.

A vertically extending pin 55 of known diameter is fixed in the portion 11 of the bed of the machine at a known distance from the axis of the pin 18 and in alignment with the axis of the pin 18 perpendicularly with respect to the path of movement of the table 14. A second vertically extending pin 56 preferably of the same diameter as the pin 55 is secured in the bracket 17 at the same distance from the axis of the pin 18 as the pin 55 and on a line parallel with the axis of the supporting bar 20 and passing through the axis of the pin 18. Knowing then that in order to bring the side of the tooth to be checked into theoretically parallel relationship with respect to the path of movement of the table 14 the angle between the lines drawn through the axis of the pins 55 and 18, and pins 56 and 18, must equal the angle of the side of the tooth; and knowing the diameters of the measurement pins 55 and 56, the table 17 may be shifted until the distance between the pins 55 and 56 equals the required amount necessary to bring about the desired angular condition of the bracket 17, and the bracket 17 then be locked in position by the bolts 23 and nuts 24. The exact distance between the pins 55 and 56 for any required angle of the bracket 17 may, of course, be accurately determined by a simple trigonometric calculation.

In the construction shown in the drawings, when it is desired to test the opposite sides of the teeth of the hob 25, the hob is simply reversed on the bar 20. It is, of course, also apparent that the end 47 of the pointer 41 is positioned in horizontal alignment with the axis of the bar 20, and that in testing each tooth of the hob such tooth is brought into correct horizontal position with respect to the pointer by rotating the hob on the supporting bar 20. The term tooth is herein used as including a thread.

Formal changes may be made in the specific embodiment of the invention described without departing from the spirit or substance of the broad invention, the scope of which is commensurate with the appended claims.

What we claim is:

1. In a device of the class described, and in combination: a bed; a table slidably mounted thereon for straight-line reciprocatory movement; a bracket adjustable on said bed, in a plane parallel with the plane of said table, said bracket being provided with means for supporting a piece of work stationary with its axis disposed in a plane parallel to and at an adjustably predetermined angle to the direction of a reciprocatory movement of said table; and a gaging device carried by and movable with said table and having a pointer cooperable with said work,—said bracket and bed having thereon means affording guidance to a positioning of said work at such an angle to a direction of said reciprocatory movement as shall render a line of cooperation of said pointer with said work substantially parallel with said direction.

2. In a device for checking the angularity of the sides of rotatable cutter teeth and the like, in combination, a bed, a table mounted for straight line reciprocatory movement thereon, a bracket swingably mounted on said bed for adjustment in a plane parallel to the plane of said table, means for supporting work to be checked stationary upon said bracket, gauging means carried by said table and including a feeler element cooperable with a line in a surface of said work, and means for securing said work at such an angle to a direction of said reciprocatory movement as shall render said line substantially parallel therewith.

3. In a device of the class described, a bed, a table slidably mounted on said bed for straight line movement, a bracket pivotally mounted on said bed for swinging movement in a plane parallel to the plane of said bed, means for locking said bracket in any one of a plurality of swingable positions on said bed, a work support carried by said bracket, a gauge support carried by said table, a gauge slidably mounted on said gauge support, and a work engaging pointer cooperating with said gauge and movable in a plane parallel with the mentioned planes.

4. In a device of the class described, a bed, a table slidably mounted on said bed for straight line movement, a bracket pivotally mounted on said bed for swinging movement in a plane parallel to the plane of said bed, means for locking said bracket in any one of a plurality of swingable positions on said bed, a work support carried by said bracket and adapted to hold said work with its axis parallel with said plane, a gauge support carried by said table at an angle to its path of movement, a gauge slidably mounted on said gauge support, means for moving said table, and indicating means for determining the extent of movement of said table.

5. In a device for testing tooth surfaces: a bed; means, including a bracket element and an arm element, one of said elements being pivoted for movement relatively to said bed, for supporting a toothed work unit with its axis in a predetermined direction relatively to said bed; a finger element mounted for slidable engagement with said surfaces and for oscillation in a plane; means on said bed for producing reciprocatory movement between said element and said unit in said plane; and means for revealing any oscillatory movement of said element resulting from such reciprocatory movement.

6. In a device for testing tooth surfaces; a bed; means for supporting a toothed unit from said bed with its axis in a predetermined direction in a plane parallel with said bed; a pressure-receiving finger element mounted for slidable engagement with said surfaces and for oscillation in said plane; means on said bed for producing reciprocatory movement between said element and said unit in said plane; and means for revealing any oscillatory movement of said element resulting from such reciprocatory movement,— said supporting means including a bracket member pivoted to said bed for movement in a plane parallel therewith.

7. In a device for testing tooth surfaces; a bed; means for supporting a toothed unit from said bed with its axis in a predetermined direction in a plane parallel with said bed; a pressure-receiving finger element mounted for slidable engagement with said surfaces and for oscillation in said plane; means on said bed for producing reciprocatory movement between said element and said unit in said plane; and means for revealing any oscillatory movement of said element resulting from such reciprocatory movement,—said supporting means including a bracket member pivoted to said bed for movement in a plane parallel therewith and provided with means to aid in determining the angular relationship between said axis and the direction of said relative movement.

8. In a device for testing tooth surfaces: a bed; means for supporting a toothed unit from said bed with its axis in a predetermined direction in a plane parallel with said bed; a pressure-receiving finger element mounted for slidable engagement with said surfaces and for oscillation in said plane; means on said bed for producing reciprocatory movement between said element and said unit in said plane and means for revealing any oscillatory movement of said element resulting from such reciprocatory movement,—said supporting means including a bracket member pivoted to said bed for movement in a plane parallel therewith and provided with a clamping means including a plurality of arcuate slots through which extend a plurality of bolts.

9. In a device for testing tooth surfaces; a bed; means for supporting a toothed unit from said bed with its axis in a predetermined direction in a plane parallel with said bed; a pressure-receiving finger element mounted for slidable engagement with said surfaces and for oscillation in said plane; means on said bed for producing reciprocatory movement between said element and said unit in said plane; and means for revealing any oscillatory movement of said element resulting from such reciprocatory movement,—said supporting means including a bracket member pivoted to said bed for movement in a plane parallel therewith, and said bed and said bracket being provided with means including measurement pins affording guidance in disposition of said axis in a desired angular relationship to the reciprocatory movement.

10. In a device for testing toothed surfaces, a bed, means for supporting a toothed unit from said bed with its axis in a predetermined direction in a plane parallel with said bed, a finger element adapted to slidably engage said surfaces, a support for said element, said support mounting said element for oscillation in said plane, means on said bed for producing reciprocatory movement between said element and said unit in said plane, and means for revealing any oscillatory movement of said element resulting from such reciprocatory movement, said movement producing means including a slidable table, and said finger element support including a yoke member and a pivot provided with means for permitting the longitudinal shifting of the element relative thereto.

11. In a device for testing toothed surfaces, a bed, means for supporting a toothed unit from said bed with its axis in a predetermined direction in a plane parallel to said bed, a finger element adapted to slidably engage said surfaces, a support for said element, said support mounting said element for oscillation in said plane, means on said bed for producing reciprocatory movement between said element and said unit in said plane, and means for revealing any oscillatory movement of said element resulting from such reciprocatory movement, said movement producing means including a slidable table, and said finger element being mounted by a yoke member and a pivot provided with interfitting axle members.

12. In a device for testing toothed surfaces, a finger element adapted to slidably engage said surfaces, a support for said element, said support mounting said element for oscillation in a plane, said support for said finger element including a yoke member, interfitting axle members and pivot screws threaded into said yoke member and engaging said axle members.

JOSEPH C. DRADER.
WILLIAM F. DALZEN.